(12) United States Patent
Matthews, Jr. et al.

(10) Patent No.: US 8,498,799 B2
(45) Date of Patent: Jul. 30, 2013

(54) SYSTEM AND METHOD FOR CONTROLLING FUEL INJECTION IN ENGINES CONFIGURED TO OPERATE USING DIFFERENT FUELS

(75) Inventors: James C. Matthews, Jr., West Bloomfield, MI (US); Louis A. Avallone, Milford, MI (US); Robert J. Horner, Dexter, MI (US); Nicholas John Kalweit, Novi, MI (US); Marc Sauve, Bowmanville (CA); Charles E. Leady, Waterford, MI (US); Grant Meade, Whitby (CA); Amir R. Lodhi, Commerce Township, MI (US)

(73) Assignee: GM Global Technology Operations LLC

( * ) Notice: Subject to any disclaimer, the term of this patent is extended or adjusted under 35 U.S.C. 154(b) by 265 days.

(21) Appl. No.: 13/110,276

(22) Filed: May 18, 2011

(65) Prior Publication Data

US 2012/0296552 A1    Nov. 22, 2012

(51) Int. Cl.
*F02D 41/30*    (2006.01)

(52) U.S. Cl.
USPC ........... 701/104; 701/103; 123/525; 123/575; 123/576; 123/577; 123/578

(58) Field of Classification Search
USPC ................... 123/525, 575–578; 701/103–104
See application file for complete search history.

(56) References Cited

U.S. PATENT DOCUMENTS

2011/0202256 A1* 8/2011 Sauve et al. ................... 701/104

* cited by examiner

*Primary Examiner* — Stephen K Cronin
*Assistant Examiner* — Joseph Dallo

(57) ABSTRACT

A first control system for an engine includes first and second control modules. The first control module determines first and second fuel masses for first and second fuel injection systems of the engine, respectively, and that controls the first fuel injection system to inject a first fuel based on the first fuel mass. The second control module controls the second fuel injection system to inject a second fuel based on the second fuel mass. A second control system for an engine includes first and second control modules. The first control module controls a first fuel injection system of the engine to inject a first fuel and selectively disables at least one of a plurality of components of a second fuel injection system of the engine. The second control module controls the second fuel injection system to inject a second fuel.

24 Claims, 3 Drawing Sheets

SYSTEM AND METHOD FOR CONTROLLING FUEL INJECTION IN ENGINES CONFIGURED TO OPERATE USING DIFFERENT FUELS

FIELD

The present disclosure relates to internal combustion engines and more particularly to a system and method for controlling fuel injection in engines configured to operate using different fuels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel from a plurality of fuel injectors, respectively, to create an air/fuel (A/F) mixture. Pistons within the cylinders compress and the A/F mixture is combusted to drive the pistons that rotatably turn a crankshaft and generate drive torque. The fuel may be a liquid fuel (gasoline, diesel, ethanol, etc.) or a gaseous fuel (natural gas, hydrogen, etc.). Engines may be configured to operate using different fuels or different blend fuels. For example, bi-fuel engines may operate using two different fuels.

SUMMARY

A first control system for an engine includes first and second control modules. The first control module determines first and second fuel masses for first and second fuel injection systems of the engine, respectively, and that controls the first fuel injection system to inject a first fuel based on the first fuel mass. The second control module controls the second fuel injection system to inject a second fuel based on the second fuel mass.

A second control system for an engine includes first and second control modules. The first control module controls a first fuel injection system of the engine to inject a first fuel and selectively disables at least one of a plurality of components of a second fuel injection system of the engine. The second control module controls the second fuel injection system to inject a second fuel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
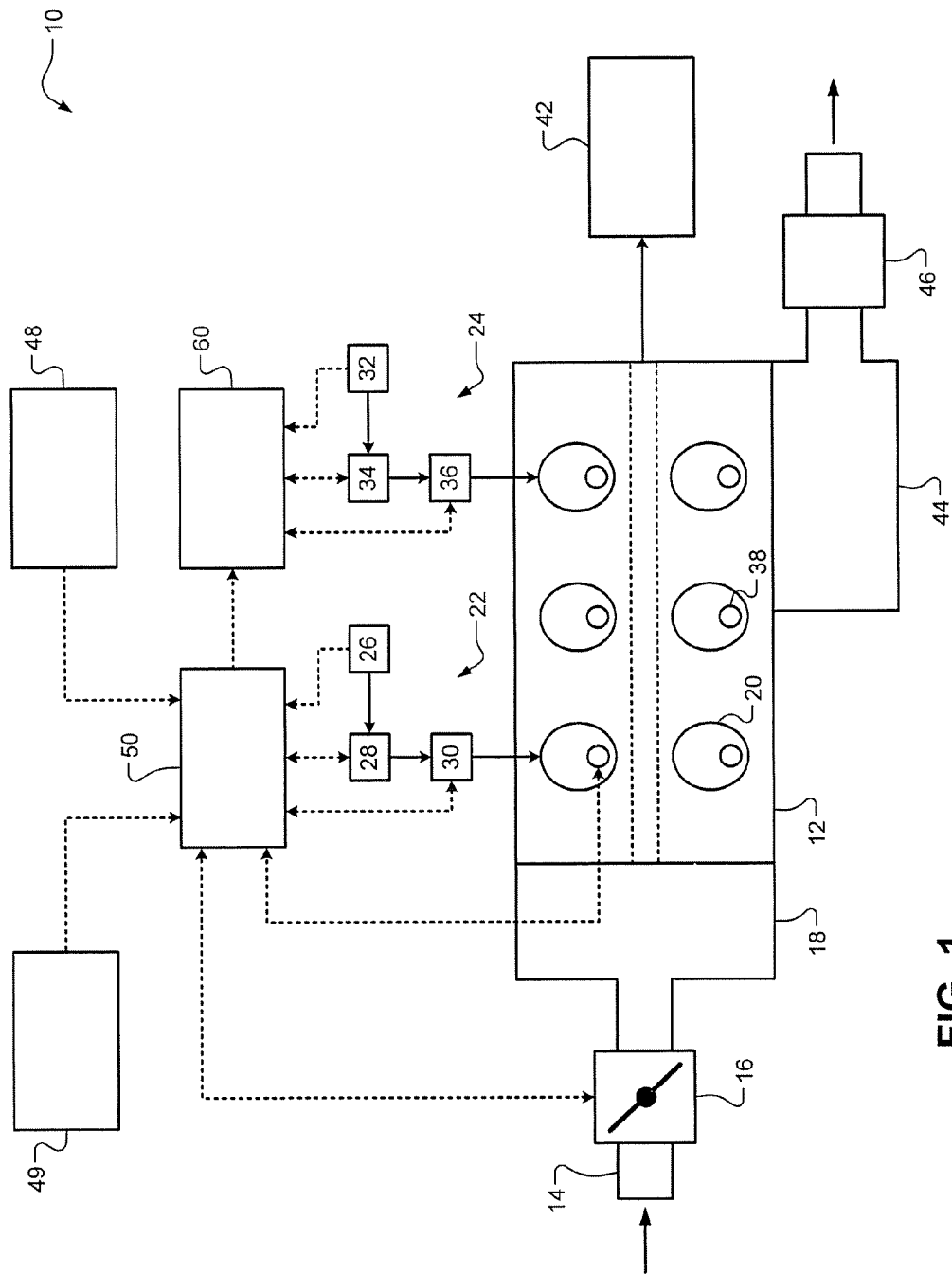
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Engines configured to operate using different fuels may have separate fuel systems for each of the different fuels. Fuels may have different chemical compositions rather than merely different blends. For example, gasoline and natural gas have different chemical compositions whereas gasoline and E85 (85% ethanol) merely have different ethanol blends. A fuel system may function differently depending on the fuel associated with the system (i.e., the chemical composition of the fuel). Therefore, each of these fuel systems may have an independent control module for controlling injection of the corresponding fuel.

For example, one control module may control injection of a first fuel and another control module may control injection of a second fuel. Implementing independent control modules, however, may require hardware modifications which increases cost and/or complexity. For example, implementing independent control modules for the different fuel systems may require interrupting/splicing wires and adding additional signal pins. In addition, having independent control modules requires additional hardware for detecting failures and disabling the corresponding fuel system. For example, each of the independent control modules may include a processor that requires diagnostic verification.

Accordingly, a system and method are presented for improved control of fuel injection in an engine configured to operate using different fuels (i.e., different chemical compositions). The system and method may control a first fuel injection system to inject a first fuel using a first control module. The first control module may also control the engine. Therefore, the first control module may also be referred to as an engine control module (ECM).

The first control module may also generate first and second fuel masses for the first fuel injection system and a second fuel injection system of the engine, respectively. The first fuel mass may be determined based on at least one of (i) a first plurality of operating parameters and (ii) characteristics of the first fuel. The second fuel mass, on the other hand, may be determined based on at least one of (i) a second plurality of operating parameters and (ii) characteristics of the second fuel. The first and second pluralities of operating parameters may be different. However, in some implementations the first and second pluralities of operating parameters may overlap or may be the same. Similarly, the characteristics of the first and second fuels may be different. However, in some implementations the characteristics of the first and second fuels may overlap.

A second control module may control the second fuel injection system to inject a second fuel based on the second fuel mass. The first and second fuels may have different chemical compositions. Rather, the first and second fuels may not be merely different blends. For example, the first fuel may be gasoline (i.e., octane), or another suitable fuel such as diesel. Additionally, for example, the second fuel may be compressed natural gas (CNG), liquefied propane gas (LPG), or another suitable fuel such as liquefied natural gas (LNG). The second control module may only control the second fuel injection system. Therefore, the second control module may also be referred to as a fuel injection control module (FICM). For example, the first and second control modules may be distributed and independent of each other and the second control module may not include a processor.

Additionally or alternatively, the first control module may selectively disable at least one of a plurality of components of the second fuel injection system. The first control module may selectively disable at least one of a plurality of components of the second fuel injection system based on an electronically generated fuel system enable signal. For example, the enable signal may be based on safety criteria for the first control module and/or additional sensor inputs such as crash sensors. In some implementations, the enable signal may be used in conjunction with other control signals (e.g., logical AND gates) to control the one or more components of the second fuel injection system. In other implementations, however, the first control module may selectively generate a disable signal that directly disables at least one of the plurality of components of the second fuel injection system.

Referring now to FIG. 1, an example engine system 10 includes an engine 12. The engine 12 may be a spark ignition (SI) engine, a diesel engine, a homogeneous charge compression ignition (HCCI) engine, or another suitable type of engine. In hybrid engine systems, the engine system 10 may also include additional components such as an electric motor and a battery system. The engine 12 may be configured to operate using different fuels. For example, the engine 12 may be a bi-fuel engine that operates using (i) gasoline and (ii) CNG or LPG.

The engine 12 draws air into an intake manifold 18 through an induction system 14 that may be regulated by a throttle 16. For example, the throttle 16 may be electrically controlled based on driver input 48 using electronic throttle control (ETC). The air in the intake manifold 18 is distributed to a plurality of cylinders 20. The air may be combined with a first fuel from a first fuel injection system 22 to create an air/fuel (NF) mixture. The first fuel may be gasoline (i.e., octane) or another suitable fuel such as diesel. Therefore, the first fuel injection system 22 may include a first fuel tank 26, a first fuel pump 28, and a first plurality of fuel injectors 30. The first fuel pump 28 may selectively pump the first fuel from the first fuel tank 26 to the first plurality of fuel injectors 30. The first plurality of fuel injectors 30 may selectively inject the first fuel into the cylinders 20, respectively.

Alternatively, the air may be combined with a second fuel from a second fuel injection system 24 to create the NF mixture. While a bi-fuel injection system is shown, the engine system 10 may include other numbers of fuel injection systems. The second fuel may be CNG, LPG, or another suitable type of fuel such as liquefied natural gas (LNG), adsorbed natural gas (ANG), and/or hydrogen. Therefore, the second fuel injection system 24 may include a second fuel tank 32, a shutoff valve 34, and a second plurality of fuel injectors 36.

The second fuel in the second fuel tank 32 may be pressurized and therefore the shutoff valve 34 may selectively stop the flow of the second fuel from the second fuel tank 32 to the second plurality of fuel injectors 36. Alternatively, however, the second fuel may be a liquid fuel. For example, the second fuel may be LPG. Therefore, a second fuel pump 34 may selectively pump the second fuel from the second fuel tank 32 to the second plurality of fuel injectors 36. The second plurality of fuel injectors 36 may selectively inject the second fuel into the cylinders 20, respectively.

The A/F mixture is compressed within the cylinders 20 using pistons (not shown). Depending on the type of engine 12, spark plugs 38 may ignite the compressed A/F mixture. The combustion of the A/F mixture within the cylinders drives the pistons (not shown) which rotatably turn a crankshaft 40 and generate drive torque. The drive torque may be transferred to a driveline 42 of the vehicle via a transmission (not shown) and in some implementations a torque converter (not shown). Exhaust gas produced during combustion may be expelled from the cylinders 20 into an exhaust manifold 44. An exhaust treatment system 46 may treat the exhaust gas to decrease emissions before releasing the exhaust gas into the atmosphere. For example, the exhaust treatment system 46 may include at least one of an oxidation catalyst (OC), nitrogen oxide (NOx) absorbers/adsorbers, a selective catalytic reduction (SCR) system, a particulate matter (PM) filter, and a three-way catalytic converter. Additional sensors 49 may measure other operating parameters. For example, the additional sensors 49 may include crash sensors (e.g., accelerometers) for use in determining whether a crash/accident has occurred.

A first control module 50 controls operation of the engine system 10 and specifically the first fuel injection system 22. The first control module 50, therefore, may also be referred to as ECM 50. The first control module 50 may receive signals from the throttle 16, the first fuel tank 26, the first fuel pump 28, the first plurality of fuel injectors 30, the spark plugs 38, the driver input 48, and/or the additional sensors 49. The first control module 50 may also control the throttle 16, the first fuel pump 28, the first plurality of fuel injectors 30, and/or the spark plugs 38. For example, the first control module 50 may control the first fuel injection system 22 based on the fuel system enable signal. The first control module 50 may also communicate with and/or control other components of the engine system 10 such as the throttle 16, the driveline 42 and/or the exhaust treatment system 46.

A second control module 60 controls operation of the second fuel injection system 24. In some implementations, the second control module 60 may control only the second fuel injection system 24. The second control module 60, therefore, may also be referred to as FICM 60. The second control module 60 receives signals from the second fuel tank 32, the second fuel pump or shutoff valve 34, and/or the second plurality of fuel injectors 36. The second control module 60 may control the second fuel pump or shutoff valve 34 and/or the second plurality of fuel injectors 36. The first and second control modules 50 and 60, collectively, may also implement the system or method of the present disclosure.

Figure 2:
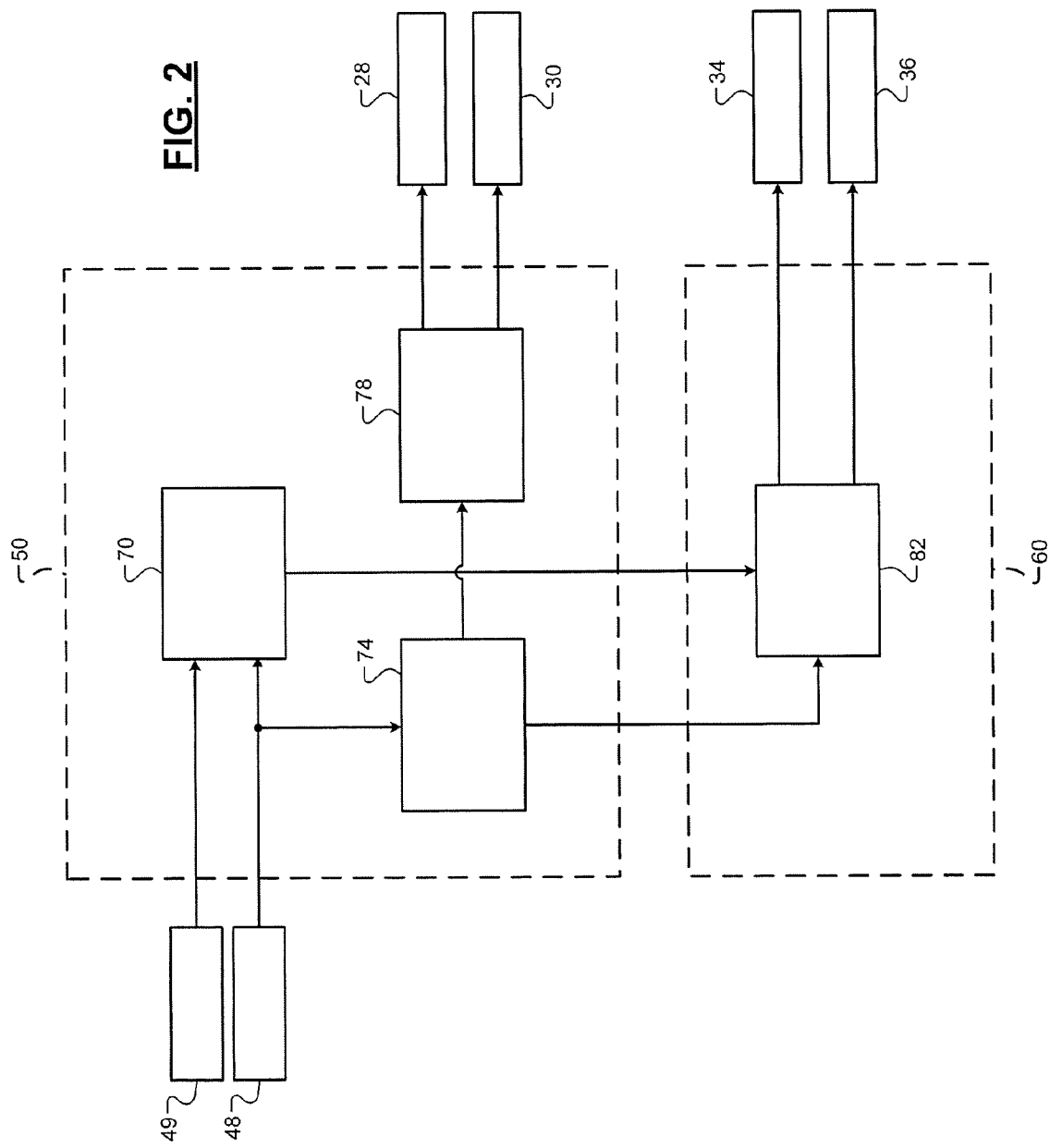
FIG. 2 is a functional block diagram of an example first control module and an example second control module according to one implementation of the present disclosure.

Referring now to FIG. 2, examples of the first control module 50 and the second control module 60 are shown. The first control module 50 may include a fuel system disable module 70, a fuel mass determination module 74, and a first injection control module 78. The first control module 50 controls the first fuel injection system 22 to inject the first fuel based a first fuel mass. Additionally or alternatively, the first control module 50 may selectively disable one or more components of the second fuel injection system 24 based on the fuel system enable signal.

The fuel system disable module 70 selectively generates a fuel system enable signal based on driver input 48 and/or additional sensor inputs 49. One or more components of the second fuel injection system 24 may be disabled based on the fuel system enable signal. For example, the fuel system enable signal may be based on safety criteria of the first control module 50 and/or the additional sensor inputs 49 such as crash sensors. Alternatively, for example, the fuel system enable signal may be a driver selection 48 between fueling the engine 12 using the first fuel or the second fuel. In some implementations, the fuel system enable signal is used in conjunction with control signals (e.g., logical AND gates) generated by the second control module 60 for controlling components of the second fuel injection system 24 (e.g., the shutoff valve or second fuel pump 34 and/or the second plurality of fuel injectors 36).

In other implementations, the fuel system disable module 70 may selectively generate a disable signal based on the driver input 48 and/or additional sensors 49 that is used to disable one of more of the components of the second fuel injection system 24. The second control module 60 may control the second fuel injection system 24 based on the disable signal. Therefore, when the disable signal is generated the second control module 60 may disable one or more component of the second fuel injection system 24. For example, the second control module 60 may (i) close the shutoff valve 34 or disable the second fuel pump 34, or (ii) disable the second plurality of fuel injectors 36.

The fuel mass determination module 74 determines first and second fuel masses for the first fuel injection system 22 and the second fuel injection system 24, respectively. The fuel mass determination module 74 may determine the first fuel mass based on at least one of (i) a first plurality of operating parameters and (ii) characteristics of the first fuel. Similarly, the fuel mass determination module 74 may determine the second fuel mass based on at least one of (i) a second plurality of operating parameters and (ii) characteristics of the second fuel.

As previously described, the first and second pluralities of operating parameters may be different, may overlap, or may be the same. For example, the operating parameters may include but are not limited to driver input 48, additional sensor inputs 49, mass air flow (MAF), intake manifold absolute pressure (MAP), intake air temperature (IAT), engine coolant temperature (ECT), engine speed (RPM), exhaust gas temperature (EGT), and/or exhaust gas oxygen concentration (O2). For example only, the driver input 48 may be a position of an accelerator.

Also as previously described, the characteristics of the first and second fuels may be different or may overlap. For example, the characteristics may include but are not limited to flash point, boiling point, freezing point, specific gravity, weight per unit volume, minimum/maximum compression ratio, NF ratio for maximum power, energy generated by combustion, and/or cooling effect (e.g., due to latent heat from vaporization). For example only, engines optimized for CNG may have a higher maximum compression ratio than engines optimized for gasoline. CNG exists in a gaseous state whereas gasoline exists in a liquid state.

The first injection control module 78 controls the first fuel injection system 22 to inject the first fuel based on the first fuel mass. Specifically, the first injection control module 78 may control the first fuel pump 28 and/or the first plurality of fuel injectors 30 based on the first fuel mass. For example, the first injection control module 78 may determine a desired pulse width based on the first fuel mass and may then generate pulse-width modulated (PWM) control signals having the desired pulse width for the first plurality of fuel injectors 30.

The second control module 60 may include a second injection control module 82. In some implementations, the second injection control module 82 may be disabled by the disable signal or may disable one or more components of the second fuel injection system 24 based on the disable signal. For example, the second injection control module 82 may disable the second fuel pump or shutoff valve 34 and/or the second plurality of fuel injectors 36 when the disable signal is received.

The second injection control module 82 may control the second fuel injection system 24 to inject the second fuel based on the second fuel mass. For example, the second injection control module 82 may determine a desired pulse width based on the second fuel mass and may then generate PWM control signals having the desired pulse width for the second plurality of fuel injectors 36. In some implementations, as previously described, the enable signal may be used in conjunction with control signals (e.g., logical AND gates) for controlling the shutoff valve or second fuel pump 34 and/or the second plurality of fuel injectors 36.

Figure 3:
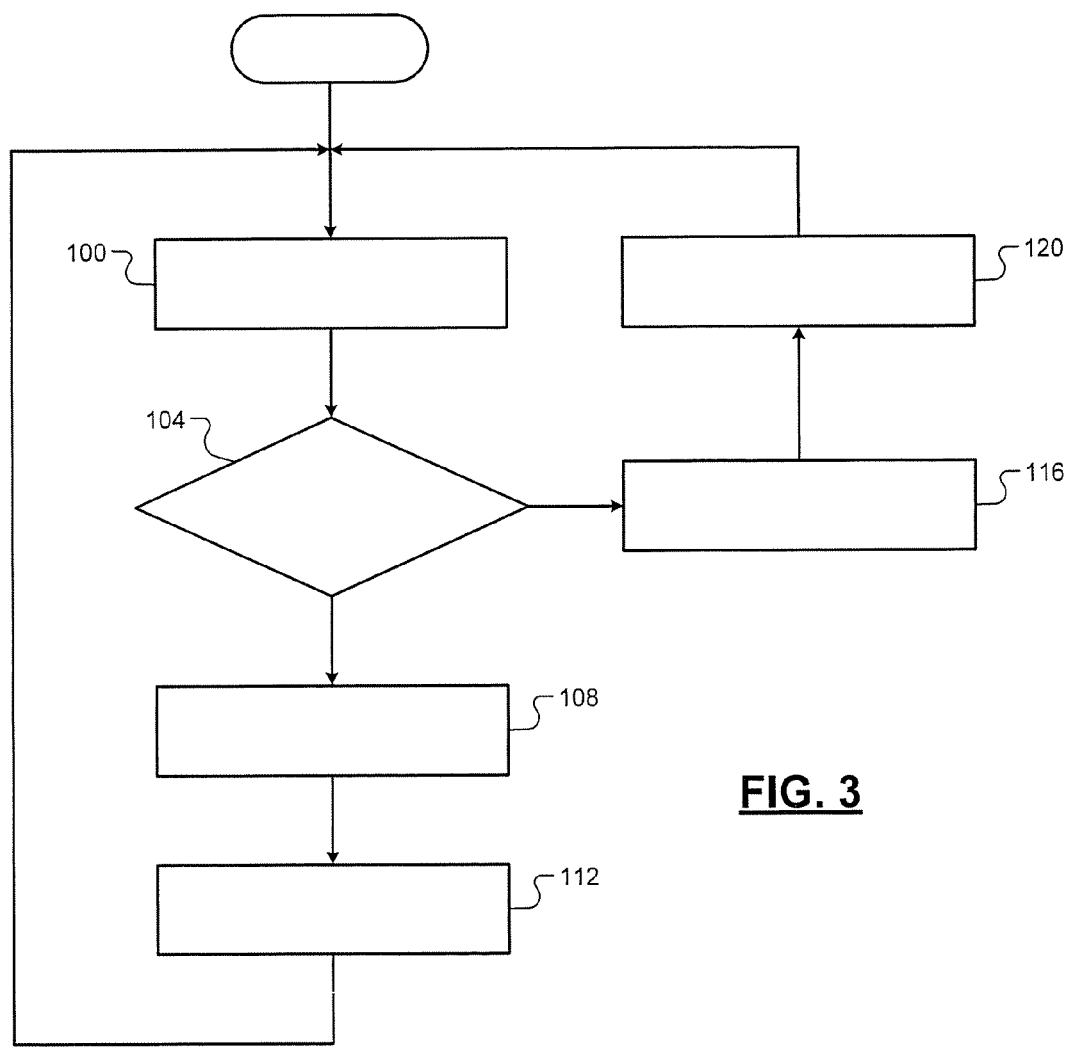
FIG. 3 is a flow diagram illustrating an example method for controlling fuel injection in engines configured to operate using different fuels according to one implementation of the present disclosure.

Referring now to FIG. 3, an example method for controlling fuel injection in an engine configured to operate using different fuels begins at 100. At 100, the first control module 50 may generate first and second fuel masses. At 104, the first control module 50 may determine whether to disable the second fuel injection system 24. For example, the first control module 50 may disable the second fuel injection system based on safety criteria and/or additional sensor inputs 49 (e.g., crash sensors). If true, control may proceed to 108. If false, control may proceed to 116. At 108, the first control module 50 may disable the second fuel injection system 24. At 112, the first control module 50 may control the first fuel injection system 22 to inject the first fuel based on the first fuel mass. Control may then return to 100. At 116, the first control module 50 may enable the second fuel injection system 24. At 120, the second control module 60 may control the second fuel injection system 24 to inject the second fuel based on the second fuel mass. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
    a first control module that determines first and second fuel masses for first and second fuel injection systems of the engine, respectively, and that controls the first fuel injection system to inject a first fuel based on the first fuel mass; and
    a second control module that controls the second fuel injection system to inject a second fuel based on the second fuel mass.

2. The control system of claim 1, wherein the first and second fuels have different chemical compositions.

3. The control system of claim 1, wherein the first control module determines the first fuel mass based on at least one of (i) a first plurality of operating parameters and (ii) characteristics of the first fuel.

4. The control system of claim 1, wherein the first control module determines the second fuel mass based on at least one of (i) a second plurality of operating parameters and (ii) characteristics of the second fuel.

5. The control system of claim 1, wherein the first control module controls the engine.

6. The control system of claim 1, wherein the first fuel is gasoline.

7. The control system of claim 1, wherein the second fuel is compressed natural gas (CNG) or liquefied propane gas (LPG).

8. The control system of claim 1, wherein the first control module selectively disables at least one of a plurality of components of the second fuel injection system.

9. The control system of claim 8, wherein the first control module selectively disables at least one of the plurality of components of the second fuel injection system based on at least one of driver input and safety criteria.

10. The control system of claim 9, wherein the plurality of components of the second fuel injection system includes (i) a plurality of fuel injectors and (ii) a fuel pump or a shutoff valve.

11. The control system of claim 1, wherein the first control module determines a timing schedule for injection of the first fuel by the first fuel injection system.

12. The control system of claim 1, wherein the second control module determines a timing schedule for injection of the second fuel by the second fuel injection system.

13. A control system for an engine, the control system comprising:
    a first control module that controls a first fuel injection system of the engine to inject a first fuel and that selectively disables at least one of a plurality of components of a second fuel injection system of the engine; and
    a second control module that controls the second fuel injection system to inject a second fuel.

14. The control system of claim 13, wherein the first control module selectively disables at least one of the plurality of components of the second fuel injection system based on at least one of driver input and safety criteria.

15. The control system of claim 14, wherein the plurality of components of the second fuel injection system includes (i) a plurality of fuel injectors and (ii) a fuel pump or a shutoff valve.

16. The control system of claim 15, wherein the first control module selectively generates an enable signal based on at least one of the driver input and the safety criteria.

17. The control system of claim 16, wherein the enable signal is used in conjunction with each of a plurality of control signals via logical AND gates to control the plurality of components of the second fuel injection system, respectively.

18. The control system of claim 15, wherein the first control module selectively generates a disable signal for at least one of the plurality of components of the second fuel injection system.

19. The control system of claim 13, wherein the first control module controls the engine.

20. The control system of claim 13, wherein the first fuel is gasoline.

21. The control system of claim 13, wherein the second fuel is compressed natural gas (CNG) or liquefied propane gas (LPG).

22. The control system of claim 13, wherein the first control module determines first and second fuel masses to be injected by the first and second fuel injection systems, respectively.

23. The control system of claim 13, wherein the first control module determines a timing schedule for injection of the first fuel by the first fuel injection system.

24. The control system of claim 13, wherein the second control module determines a timing schedule for injection of the second fuel by the second fuel injection system.

* * * * *